United States Patent [19]
Gabriel et al.
[11] 3,922,482
[45] Nov. 25, 1975

[54] WIRED BROADCASTING SYSTEMS

[75] Inventors: Ralph Parton Gabriel, Chobham, Near Woking; Eric John Gargini, West Drayton, both of England

[73] Assignee: Communications Patents Limited, London, England

[22] Filed: Aug. 20, 1971

[21] Appl. No.: 173,390

[30] Foreign Application Priority Data

Aug. 20, 1970 United Kingdom .............. 41537/70

[52] U.S. Cl. .................................. 178/5.1; 325/308
[51] Int. Cl.² ........................................... H04N 1/44
[58] Field of Search ......... 178/5.1; 325/31, 32, 308, 325/309

[56] References Cited

UNITED STATES PATENTS

| | | | |
|---|---|---|---|
| 2,907,816 | 10/1959 | Weiss | 178/5.1 |
| 2,910,527 | 10/1959 | De Vries | 178/5.1 |
| 3,065,294 | 11/1962 | Toulon | 178/5.1 |
| 3,244,809 | 4/1966 | Fuller et al. | 325/309 |
| 3,387,083 | 6/1968 | Farber et al. | 178/5.1 |
| 3,435,130 | 3/1969 | Banning, Jr. | 178/5.1 |
| 3,466,385 | 9/1969 | Hendrickson | 178/5.1 |
| 3,504,109 | 3/1970 | Spencer | 178/5.1 |

*Primary Examiner*—Maynard R. Wilbur
*Assistant Examiner*—S. C. Buczinski
*Attorney, Agent, or Firm*—Laurence R. Brown

[57] ABSTRACT

A wired television broadcasting program exchange provides a signal channel for at least one auxiliary dc or low-frequency signal of a nature that will perform the auxiliary functions of unscrambling, conversion to wide-band operation or other controls to equipment at a subscriber's station.

7 Claims, 1 Drawing Figure

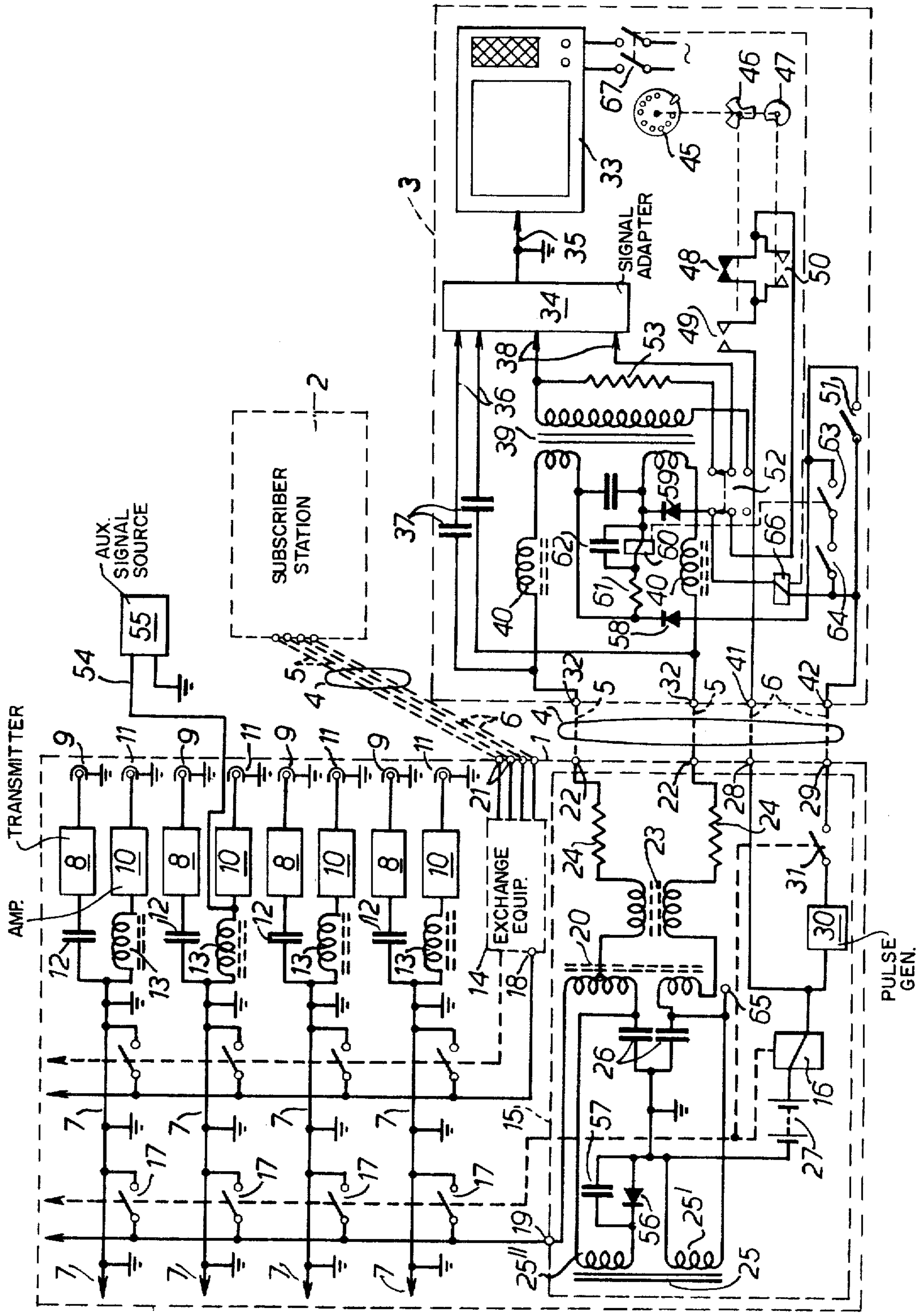
INVENTOR

WIRED BROADCASTING SYSTEMS

This invention relates to wired broadcasting systems of the kind described and claimed in our U.S. Pat. No. 3,706,040 issued Dec. 12, 1972 and seeks to provide an improved form thereof. In accordance with the present invention a wired broadcasting system of the kind referred to is provided with means whereby one or more of the available programmes may be denied to one or more of the subscribers.

Accordingly the invention provides a wired broadcasting system in which for at least one of a plurality of different programme signals made available at a programme exchange auxiliary signal generating means are arranged to provide for said at least one of said programme signals an auxiliary signal for transmission over the cable connection between the programme exchange and the subscriber upon selection of said programme signal. Also signal responsive means actuable by said auxiliary signal is associated with the subscribers equipment for modifying or controlling the operation of the subscribers receiving equipment.

The signal responsive means may be arranged to perform a wide variety of modifying or controlling functions upon the operation of said subscribers receiving equipment, for example it may render a forbidden programme unintelligible, it may alter the line standard upon which the receiver operates so that it accords with that of the programme selected or it may change the receiver from normal operation to a condition where wide band operation is possible to provide enhanced picture definition.

In a preferred form of the present invention the auxiliary signal is transmitted with the programme signals over the conductor pair for said programme signals and comprises a direct current potential or a low frequency alternating current potential. In addition a wired broadcasting system in accordance with the present invention may be arranged to provide more than one auxiliary signal for a given programme so as to perform simultaneously two modifying and/or controlling functions at the subscribers receiving equipment. In such cases the receiving equipment will, of course, include a signal responsive means capable of a plural response or a plurality of such means each capable of a single response.

In order that the invention may be more readily understood one particular embodiment thereof will now be described by way of example only with reference to the accompanying drawing which is a schematic diagram of a wired broadcasting system including a programme exchange and a subscribers installation in accordance with the present invention.

In the drawing a programme exchange 1 is arranged to provide any one of a plurality of signals for different television programmes to each of a plurality of subscribers installations 2, 3 by means of corresponding cable connections 4. The various parts of the programme exchange, subscribers installations and cables are the same as described and shown in our U.S. Pat. No. 3,706,040, have the same reference numerals allocated thereto The cable connection includes four conductive paths formed by a first pair of conductors 5, allocated to the conveyance of programme signals and supply current in one direction from said programme exchange 1, to the subscribers 2, 3, and a second pair of conductors 6, allocated to the conveyance of control signals in the opposite direction. At the programme exchange 1 there is provided a plurality of signal highways 7, each carrying, in the example shown, signals pertaining to a different television programme. These television programme signals comprise a modulated high frequency carrier wave provided by a transmitting device 8 which is arranged to receive vision signals at a corresponding vision input terminal 9. The accompanying sound signals are at audio frequency and are provided by audio frequency power amplifiers 10 which are arranged to receive their sound input signals at corresponding sound input terminals 11. Each vision transmitter 8 and its associated sound amplifier 10 are connected to the same signal highway 7 in a mutually exclusive manner, for example, through impedance devices such as the capacitor 12, which is chosen to have a value such as to present a relatively low impedance to the passage of high frequency vision signals but a high impedance to audio frequency signals, and the inductor 13 which is chosen to have a value such as to present a relatively low impedance to audio frequency signals but a high impedance to the high frequency vision signals.

Each subscriber is provided with a corresponding set of subscriber's exchange equipment 14, 15, which comprises a programme selection means formed by an electro-mechanically-operable switch device which includes a driving solenoid 16 and a plurality of contacts 17 by means of which a connection may be made between a desired one of said signal highways and an input terminal 18, 19 of the subscriber's exchange equipment 14, 15.

As will be seen from the drawing the signal highways are arranged for operation as low impedance unbalanced signal paths and the subscriber's exchange equipment 14, 15, includes a combined balancing and impedance matching transformer 20 by means of which the low impedance unbalanced input at the terminals 18, 19 is transformed to a balanced output of high impedance at a corresponding pair of programme terminals 21, 22. Between the transformer 20 and terminals 22 there may be provided a longitudinal current suppression choke 23, the purpose of which is to reduce unbalanced signals which may be applied to the terminals 22, and a pair of impedances in the form of resistors 24, which serve to match the balanced source impedances of the transformer 20 to that of the pair of signal conductors 5.

The audio frequency signals applied to the terminal 19 are also unbalanced with respect to earth and these are transformed to balanced signals for application to the terminals 22 by means of a tapped low frequency choke 25 the outer terminals of which are connected to the inner terminals of the balanced high frequency winding on the transformer 20. The high frequency bypass capacitors 26 serve to provide a path for high frequency signals across the choke 25. The tapping on the choke 25 is arranged to establish a phantom connection to the programme signal terminals 22. To this phantom connection there is connected one end of a current supply source indicated by the battery 27. The other terminal of the battery 27 is connected to one terminal of the actuating solenoid 16 of the programme selection means. The other terminal of this solenoid 16 is connected directly to a first terminal 28 of a pair of control terminals and also to a second terminal 29 of said control terminals through a square wave generating device 30 and a homing switch contact 31 which is associated with the solenoid 16 and is arranged to be closed in any position other than a datum position in which none of the switches 17 is closed. Thus, in the datum position no television programmes are applied to the input terminal 19 of the subscriber's exchange equipment 15.

At the subscriber's installation there is arranged a pair of signal input terminals 32 from which may be derived the audio frequency signals and high frequency signals of a television programme. Since these signals are not suitable for direct application to the standard television receiver 33, there is provided a signal adaptor 34 which provides on its output line 35 signals of a type to which the receiver 33 can respond. The signal adaptor 34 requires separate inputs for the high frequency vision signals and the audio frequency sound signals and these are separated by impedance devices similar to those employed at the programme exchange for combining the signals on the signal highways 7. The capacitors 37 thus allow the passage of high frequency signals but impede the audio frequency signals, while the high frequency chokes 40 allow the passage of audio frequency signals from the input terminals 32 to the coupling transformer 39 but impede the high frequency vision signals. The primary winding of the transformer 39 which is connected to the terminals 32 is tapped to provide a phantom connection through which may be derived the supply current provided at the programme exchange by the battery 27.

The subscriber's installation also includes a dial mechanism 45 which may be of a kind similar to that employed an automatic telephone instruments. This dial mechanism serves, upon actuation by the subscriber, to establish one or a series of connections of predetermined duration between the tapping on the primary winding of the transformer 39 and the control terminals 41. To this end the dial mechanism includes two cam-members 46, 47, the cam-member 46 being associated with two contact members 48, 49, and the cam-member 47 being associated with contacts 50. The combined effect of the contacts 48, 49, 50, is to establish one connection of predetermined duration between the control terminal 41 and the transformer tap for each digit indicated by the dial mechanism 45. These connections are arranged at the programme exchange to move the programme selection means from its datum position so as to cause actuation of the required switch contact 17 which will cause input signals to appear at the terminal 19 from that signal highway 7 which is carrying the programme which the subscriber desires to receive. A further control means in the form of a push-to-make switch 51 is provided at the subscriber's installation. This switch when actuated serves to establish a connection between the other control terminal 42 and the tapping on the transformer 39. Such actuation of the switch 51 serves to cause the programme selection means at the exchange to return to its datum position, the square wave generator 30 providing the required pulses of current to effect its stepping. These pulses are interrupted by the contact 31 when the datum position is reached.

An auxiliary signal is applied to one of the signal highways 7 over a conductor 54 from an auxiliary signal source 55. The auxiliary signal source may provide either a direct current signal or an alternating current signal as may be desired. An alternating current signal is preferably of low frequency, that is below the frequency occupied by the audio frequency band and in practice somewhere below 300 Hz. In order to limit the auxiliary signal to one conductor of the high frequency pair 5 the low frequency choke 25 is provided with a split winding one half 25' being connected directly to the common conductor whilst the other 25'' is connected to the common conductor through a rectifier 56. In order to provide AC continuity across the rectifier 56 a bypass capacitor 57 is connected in shunt therewith.

At the subscribers installation the coupling transformer 39 also has its input winding split the respective halves being connected to the switches 51 and 52 by way of corresponding rectifiers 58, 59. Thus far the system will function in the same manner as that described in our U.S. Pat. No. 3,706,040 the rectifiers 56, 58 and 59 serving only to isolate the auxiliary signal from the programme selection and reset signals. The auxiliary signal is connected to a responsive means formed by a relay 60 which is connected between the adjacent ends of the split winding of the transformer 39 through a delay network consisting of the resistor 61 and the capacitor 62. The purpose of this delay network is to prevent undesired actuation of the relay 60 as the subscribers programme selection switch at the programme exchange momentarily connects his equipment to the programme carrying the auxiliary signal during its passage from one programme to another.

If at the subscribers installation 3 the dial mechanism 45 is actuated to select the programme which has associated with it the auxiliary signal the relay 60 becomes energised a short while after the programme has been selected. Contacts 63 of this relay 60 are thus actuated to effect the same control action as the reset switch 51 thus returning that subscribers programme selection switch 16 to the datum position so long as the subscriber is to be denied reception of said programme. A further switch 64 is provided in series with the relay contact 63 by means of which the effect of the operation of said relay may be nullified so permitting the subscriber to receive the programme carrying the auxiliary signal. The switch 64 may, for example, comprise a key-controlled switch which may be unlocked during such time as the subscriber is to be permitted to receive said programme.

If the auxiliary signal is arranged to modify or control some other aspects of the operation of the subscribers receiving equipment the switch 64 may be omitted and the contacts 63 connected differently to perform the desired function.

In addition a second auxiliary signal may be provided at the terminal 65 on the other of the high frequency pair of conductors 6 by associating with the winding 25' a further rectifier and bypass capacitor corresponding to those indicated at 56, 57. This second auxiliary signal may be of the same or a different type as the first auxiliary signal and arranged to actuate a further responsive device in a form of a relay 66 the contacts 67 of which are arranged to control the application of mains power to the receiver 33. By arranging that the second auxiliary signal is present only when the programme exchange is in operation the operation of the receiver 33 at times when no signals are present can be prevented. This may serve to reduce the fire hazard which may be associated with some classes of television receiver when they are operated without an input signal.

Relays 60 and/or 66 may, as previously stated, be arranged to control a variety of functions other than those described. For example, in the case of certain non-broadcast programmes which may be made available to subscribers of the wired broadcasting system it may be desirable to utilise a wider band width than normal to provide pictures of higher than normal resolution. The resolution of a standard television receiver is usually restricted by the presence of a sound trap which is necessary to exclude from the vision circuits the accompanying sound signal. It is possible however with wired broadcasting receivers to utilise the sound signal usually present at audio frequency on the programme pair and to arrange for no high frequency sound signal to accompany the nonbroadcast television signal. In this event the sound traps in the receiver will be unnecessary and these may be rendered inoperative by appropriate energisation of a relay 60, 66 so increasing the vision band width of the receiver.

In the case of systems in which the auxiliary signal is an AC signal, and a charge is to be made for the reception of at least one of the programmes the frequency of the signal may be related to the cost of a programme and frequency sensitive means may be provided at the subscribers installation to control the rate of charge to the subscriber for the reception of that programme.

What we claim is:

1. In a wired broadcasting system constructed for processing one of a plurality of programme signal channels over a cable between a programme exchange and one of a plurality of subscriber's stations, means responsive to a signal from a subscriber's station selecting one of the plurality of different programme signal channels available at said programme exchange for transmission over said cable to that subscriber's station, auxiliary signal generating means arranged to provide on at least one of said programme signal channels an auxiliary signal for transmission over the cable connection between the programme exchange and the subscriber's station upon selection of that said programme signal channel, and signal responsive means associated with the subscriber's equipment actuated from receipt of said programme signals on said at least one channel for modifying the operation of the subscriber's receiving equipment in response thereto by switching the subscriber's selection away from said selected channel at said programme exchange to another channel if a predetermined condition is established preventing access to that signal channel.

2. A wired broadcasting system as claimed in claim 1, wherein the auxiliary signal is arranged to render unintelligible a programme forbidden to a subscriber selecting said programme.

3. A wired broadcasting system as claimed in claim 1 wherein the auxiliary signal is transmitted with the programme signals over a conductor pair.

4. A wired broadcasting system as claimed in claim 1, wherein means are arranged to provide more than one auxiliary signal to provide corresponding different controlling functions upon the operation of the subscriber's receiving equipment.

5. A wired broadcasting system as claimed in claim 4, wherein the plurality of auxiliary signals differ each from the others.

6. A wired broadcasting system as claimed in claim 4, wherein one of said auxiliary signals is arranged to control the application of power to the subscribers receiving equipment only when signals are available from said programme exchange.

7. A wired broadcasting system as claimed in claim 1 where receiving equipment is located at a said subscriber's station, wherein the subscriber's receiving equipment is provided with means selectively actuable to nullify the effect of an auxiliary signal on said receiving equipment.

* * * * *